Sept. 25, 1951  J. H. WILHELM  2,569,083
METHOD AND APPARATUS FOR MOLDING AND TRIMMING
Filed March 25, 1947  3 Sheets-Sheet 1

*INVENTOR.*
JOHN H. WILHELM
BY
ATTORNEYS

Sept. 25, 1951  J. H. WILHELM  2,569,083
METHOD AND APPARATUS FOR MOLDING AND TRIMMING
Filed March 25, 1947  3 Sheets-Sheet 2
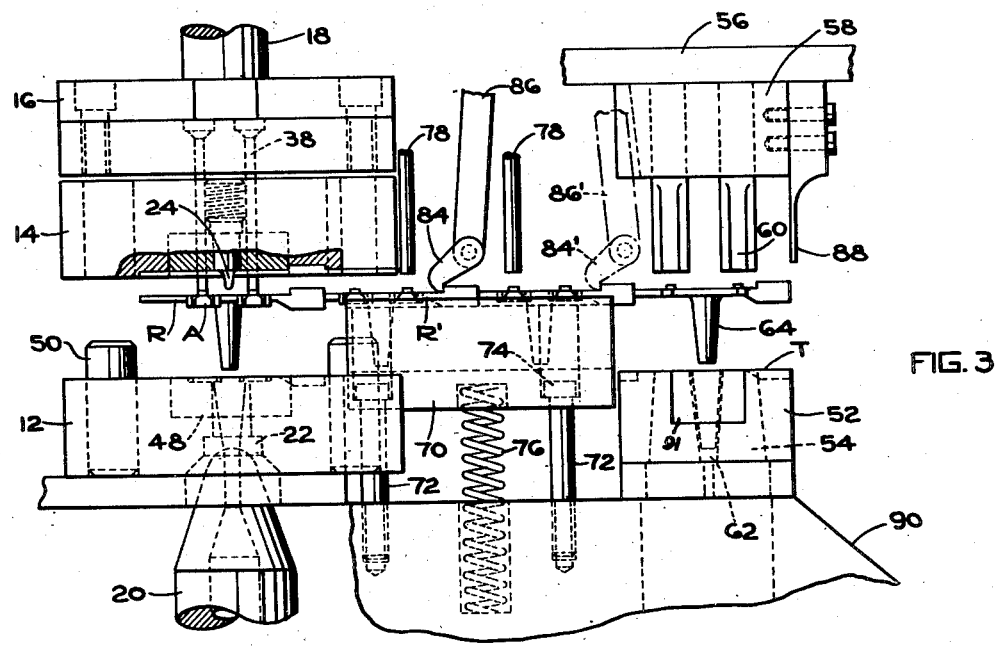
FIG. 3
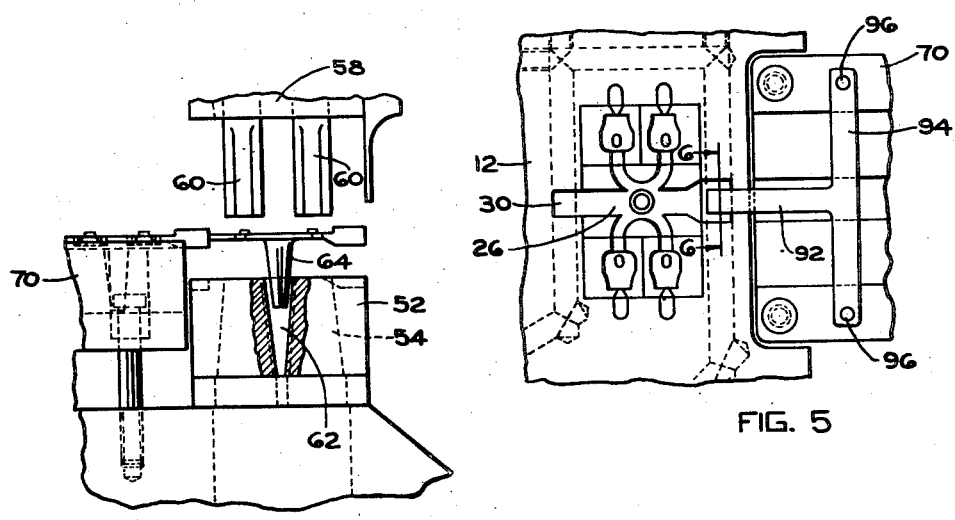
FIG. 4
FIG. 5
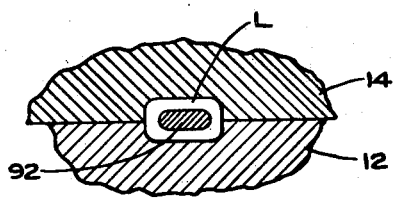
FIG. 6
INVENTOR.
JOHN H. WILHELM
BY *James and Franklin*
ATTORNEYS Sept. 25, 1951 J. H. WILHELM 2,569,083
METHOD AND APPARATUS FOR MOLDING AND TRIMMING
Filed March 25, 1947 3 Sheets-Sheet 3

INVENTOR.
JOHN H. WILHELM
BY
ATTORNEYS

Patented Sept. 25, 1951

2,569,083

UNITED STATES PATENT OFFICE 2,569,083

METHOD AND APPARATUS FOR MOLDING AND TRIMMING

John H. Wilhelm, Hamilton Beach, N. Y., assignor to Conmar Products Corporation, Newark, N. J., a corporation of New Jersey Application March 25, 1947, Serial No. 736,943

12 Claims. (Cl. 29—33)

This invention relates to molding, and more particularly to molding and trimming, especially in a continuous fashion adapted for automatic operation.

The primary object of the present invention is to generally improve the molding of articles in a die. A more particularly object is to make the operation more nearly automatic and to form the molded articles in chain formation for convenience in handling.

Still another object is to combine molding and trimming operations at the molding machine, thus facilitating return of scrap for re-melting at the machine.

Still another object is to apply the invention to the die-casting of sliders for slide fasteners and to provide a combined die-casting and trimming machine for that purpose.

To accomplish the foregoing general objects and other more specific objects which will hereinafter appear, my invention resides in the molding, feeding and trimming elements and their relation one to the other, as are hereinafter more particularly described in the following specification. The specification is accompanied by drawings, in which:

Fig. 3 is an elevation showing the parts of Fig. 2 with the molding and trimming dies in open position;

Fig. 4 is a fragmentary view showing the trimming die and spring pad in partly lowered position;

Fig. 5 is a fragmentary plan view of the mold when starting the first molding cycle;

Fig. 6 is a fragmentary section through the mold, taken approximately in the plane of the line 6—6 of Fig. 5, and drawn to enlarged scale;

Figure 1:
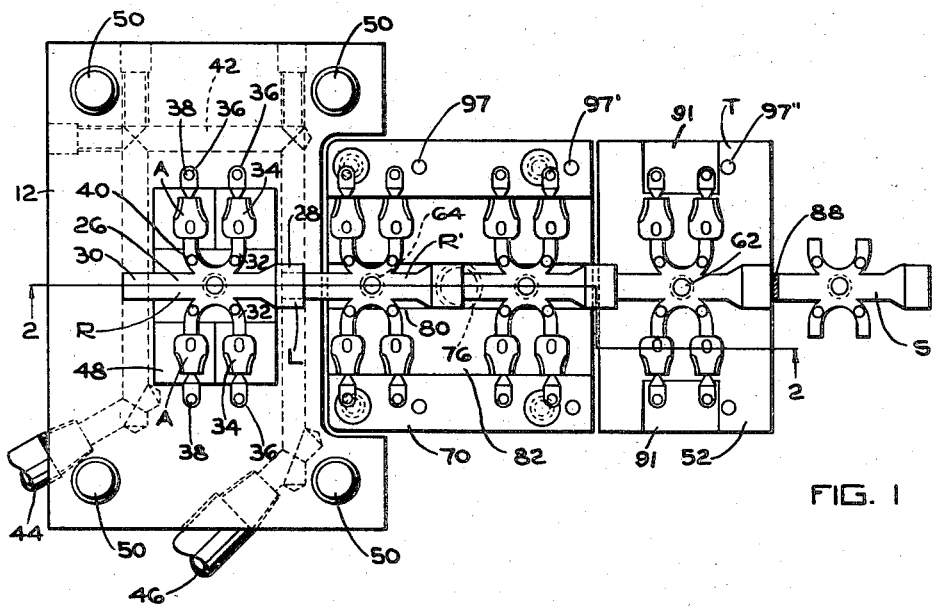
Fig. 1 is a plan view of the stationary half of molding and trimming dies for the manufacture of sliders.

Referring to the drawings, and more particularly to Figs. 1, 3 and 6, the method of my invention includes molding a runner R simultaneously with the desired articles A, thus producing a molded piece which is moved longitudinally of the runner R for a distance slightly less than the length of the runner, as is indicated by the position R'. Another set of articles and a runner is then molded, the leading end L of the next runner being molded around the trailing end of the preceding runner R', thereby forming a continuous chain of molded articles.

In accordance with a further feature of the invention, the resulting chain of molded articles may be moved past a trimming station or trimming die T, at which point the molded articles may be separated from the runner and gates connecting the articles to the runner. If desired, the chain runner may be cut into short lengths or scrap, as is indicated at S in Figs. 1 and 2, thus facilitating return of the scrap for remelting in the die-casting machine.

Considering the apparatus in greater detail, the mold comprises a cover die 12 which in the present case is disposed with its parting face in a horizontal plane. The ejector die 14 is mounted over the cover die 12, and is arranged for vertical movement between the closed position shown in Fig. 2 and the open position shown in Fig. 3, a suitable die plate 16 (Fig. 3) being carried by a plunger 18 for this purpose.

Metal is supplied to the die through a suitable nozzle 20 the end of which is pressed against a bushing or sprue passage 22. A conventional gate post 24 may be provided on the ejector die opposite the sprue passage, said gate post helping to guide the flow of metal, and serving also to ensure removal of the sprue from the sprue passage when the ejector die is raised.

The sprue passage runs directly into the cavity 26 (Fig. 1) for the runner R. This cavity is enlarged at the end 28 compared to the end 30. Suitable gates 32 branch from the runner cavity and lead into the mold cavities 34. Overflow cavities 36 help improve the quality of the cast metal in the main cavities 34, and provide surfaces on which ejector pins may bear, as indicated at 38. Additional ejector pins bear against the gate passages, as is indicated at 40.

In many respects the die may be conventional, as for example, the provision of cooling passages 42 with hose connections 44 and 46; the use of sections or inserts 48 of hardened metal for the die cavities; the use of pilots 50 to insure alignment of the halves of the die as the die closes; and the provision of an appropriate ejector plate for arresting movement of the ejector pins as the ejector die approaches the end of its upward movement.

Figure 2:
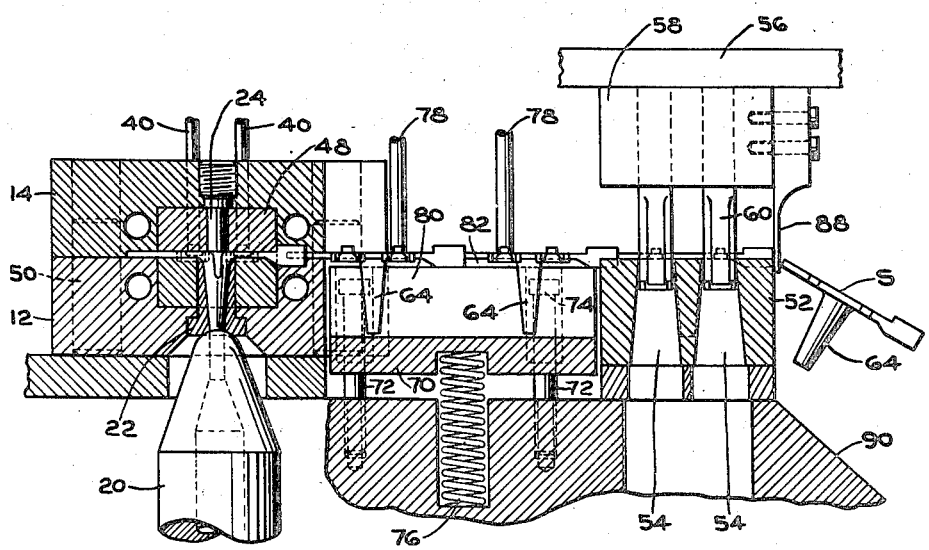
Fig. 2 is a partially sectioned elevation taken approximately in the plane of the line 2—2 of Fig. 1.

The trimming die is best shown in Figs. 2, 3 and 4. It comprises a lower portion 52 having passages 54 through which the trimmed sliders fall for collection beneath the machine. The vertically movable plate 56 carries a die block 58 which in turn carries punches 60 contoured to fit the article being molded, in this case the slider halves. In Fig. 4 it will be seen that the lower half 52 of the trimming die has a conical opening 62 dimensioned to fit the sprue 64 of the casting. Thus the sprue acts as a locating means to insure proper registration of the casting with the punches of the trimming die.

To facilitate feeding the chain of castings from the mold to the trimming die, a spring pad 70 is preferably provided. The spring pad is guided for vertical movement by appropriate pins 72 which may also function to limit upward movement of the spring pad by reason of the headed ends 74 on pins 72. The spring pad is urged upwardly by one or more compression springs 76. It is moved downwardly against the spring pressure by appropriate pins 78 which are secured to the movable head of the machine, and which are properly adjusted in length to move the spring pad down to the position indicated in Fig. 2, at which time the chain of casting is in alignment with the closed mold. It will be observed that the spring pad is deeply grooved or channeled at 80 to clear the sprue 64. The top surface of the spring pad is recessed to provide a wide, shallow passage 82 for the sliders.

When the mold opens the pins 78 rise, as shown in Fig. 3, thus permitting the spring pad 70 to rise to the height permitted by the heads 74 of pins 72. At approximately the same time the ejector pins 38 come into operation and eject the casting from the ejector die 14, thus leaving the chain of castings at the height indicated in Fig. 3 of the drawing. While the chain is in this position, appropriate feed mechanism feeds the chain one step to the right. This is indicated in Fig. 3 by the movement of a feed dog 84 carried by an arm 86 from the solid-line position to the broken-line position 84', 86'. As was previously pointed out, this feed movement is somewhat less than the length of the runner, and is such as to bring the small trailing end of a previously cast runner into that portion of the mold corresponding to the large leading end of the next runner. As here illustrated, the said large leading end acts as that part of the casting which is acted on by the feed dog 84.

In Figs. 1, 2 and 3, it will be seen that a cutting punch 88 is secured to the trimming die, the said punch functioning to sever the runner chain into short lengths which then fall into a suitable receptacle, or are guided thereto by a chute or incline 90. This is convenient because the scrap may be returned to the melting pot at the machine. Similar inclines are shown at 91 in Figs. 1 and 3 for the overflow material.

The die cavity of the mold required for the present invention is unusual in being open at one end. The open end must be closed when first starting up work. Usually a piece of runner chain is available in the machine, this being left in the machine when shutting down the day before. However, in the event that it is necessary to start operation of the machine without having a piece of runner chain available, a special fitting or plug may be used. This is indicated at 92 in Fig. 5, the said fitting or plug having the same shape and section as the small end 30 of the runner cavity 26. The plug 92 is preferably formed integrally with a cross-bar 94, which in turn is secured against movement, as by means of a pair of pins 96 received in holes in the spring pad 70 (see holes 97, 97', and 97" in Fig. 1). After the first casting or "shot" has been made, the plug is moved to holes 97', and then to holes 97". The plug is then removed, preferably before being acted on by chopper blade 88.

Figure 7:
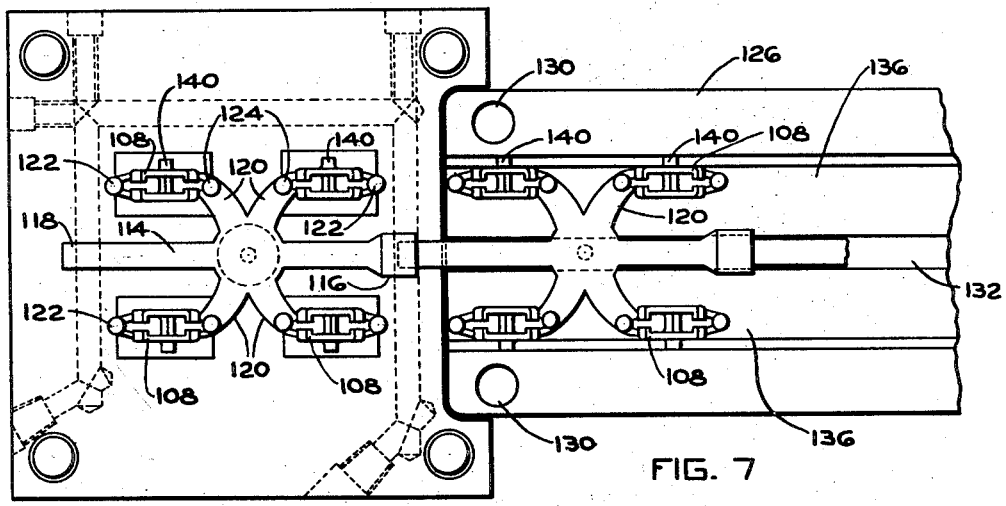
Fig. 7 is a plan view corresponding to the left-end portion of Fig. 1, but showing a modification for molding complete sliders rather than separate slider halves.
Figure 8:
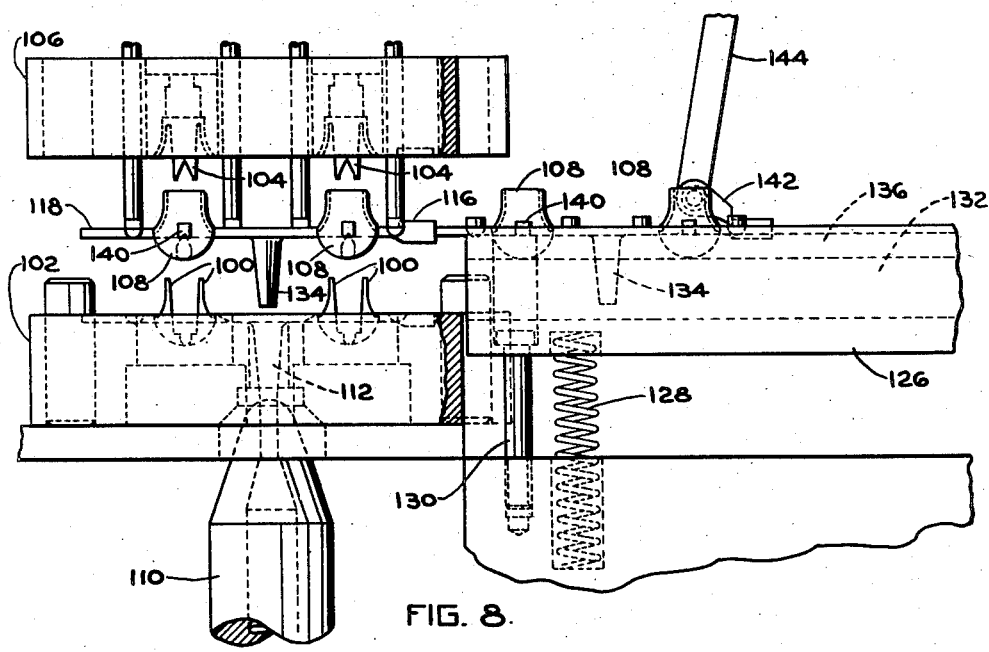
Fig. 8 is a partially sectioned elevation of the modified arrangement shown in Fig. 7.
Figure 9:
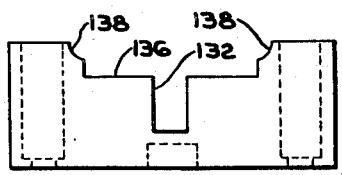
Fig. 9 shows the spring pad used in the apparatus of Figs. 7 and 8.

A modified form of the invention is illustrated in Figs. 7, 8 and 9. This differs primarily in the nature of the die cavity, which in the present case is intended to mold four complete sliders, instead of the separated halves for two sliders. The sliders are preferably molded between a cover die and an ejector die both having fixed cores, in accordance with the disclosure in Patent No. 2,415,395, issued February 4, 1947, to Frederick Ulrich. Fig. 8 shows the fixed cores 100 on the cover die 102, and the fixed cores 104 on the ejector die 106, which cores fit together to shape the interior of the slider. The sliders are shown at 108 in Figs. 7 and 8 of the drawing. They are disposed vertically, whereas in Figs. 1–6, the separated slider halves are disposed horizontally. The mold is moved vertically in either case. If it be wondered why one should bother with separated slider halves, the latter are preferred for a type of locking slider in which a large lock element must be located between the slider halves when assembling the halves together.

As before, metal is injected through a nozzle 110 (Fig. 8) leading to a spru passage 112 formed directly beneath a runner cavity located at 114 (Fig. 7), and having an enlarged end at 116 and a small end at 118. Gate passages at 120 lead from the sprue passage and the runner cavity to the mold cavities. There are separate connections to the two halves of the slider, and there are overflow passages at 122 which may also be used for cooperation with ejector pins, in addition to ejector pins located at 124 on the gates. It will be understood that in Figs. 7 and 8 the numerals are applied to the casting, and that the cavities mate with the casting, but in Fig. 7 are concealed by the casting. Fig. 7 is drawn by imagining the upper die, but not the casting, removed from Fig. 8.

A spring pad 126 is provided, this being urged upwardly by a plurality of springs 128, only one of which is shown in the drawing. The spring pad is guided by the guide pins 130 which again may function to limit the upward movement of the spring pad. The spring pad is deeply channeled at 132 to clear the sprue 134. It is also more shallowly channeled at 136 to clear the sliders 108 and the gates 120.

The configuration of the channels across the spring pad, is clearly shown in Fig. 9. The curved shoulders at 138 receive the lower ends of the lugs on the outside walls of the sliders, these lugs being indicated at 140 in Fig. 7.

The chain casting is fed intermittently by a suitable feed dog 142 carried by a feed arm 144. As before, the feed stroke is somewhat less than the length of the runner, and is such as to bring the small trailing end of the runner into the enlarged cavity for the leading end of the runner, so that the large end of each succeeding runner is cast directly around the small end of the preceding runner.

While not shown in Figs. 7 and 8, it will be understood that the spring pad is followed by a trimming die, and if desired, a chopper blade to cut the chain runner while still hot into shorter lengths or scrap, all as was described in connection with Figs. 1 through 4. The trimming die severs the four sliders from the gates and runner, and from the overflow metal, the sliders being collected in a suitable receptacle separate from the scrap.

The molding die and trimming die may be actuated by a single movable head. The feed means may also be driven by the said movable head. Other plans may be used when the invention is added to an existing molding machine.

It is believed that the method of my invention, and the apparatus for practicing the same, as well as the advantages thereof, will be apparent from the foregoing detailed description. Although I have shown and described the invention applied to die-casting, the invention is also applicable to casting by means of poured metal not under pressure. It is also applicable to the molding of plastics, either by injection molding or transfer molding, and in some cases, even compression molding. While I have shown the invention used for the manufacture of sliders for slide fasteners, it is applicable to the molding of other articles.

It will therefore be apparent that while I have illustrated the invention in several preferred forms, many changes may be made without departing from the spirit of the invention, as sought to be defined in the following claims.

I claim:

1. In the molding of articles, the method which includes molding a runner simultaneously with a plurality of articles to form a piece comprising the articles in spaced relation with respect to each other but connected through the medium of the runner, moving the molded piece longitudinally of the runner for a distance slightly less than the length of the runner, molding a like piece as aforesaid with the leading end of the runner of this piece around the trailing end of the runner of the preceding piece, thereby forming a chain of spaced, molded articles connected through the medium of the connected runners, and at a later station trimming the molded articles to separate the same from the runners and the gates connecting the articles to the runners.

2. Apparatus for molding articles, said apparatus comprising a mold separable on a parting plane, said mold being provided with a cavity for an article and a cavity for a runner extending in the parting plane of the mold, feed means to move the molded piece longitudinally of the runner cavity for a distance slightly less than the length of the runner cavity, the runner cavity portion for forming the leading end of the runner being larger than the runner cavity portion for forming the trailing end of the runner, whereby the leading end of the next runner is molded around the trailing end of a preceding runner, and so on, in order to form a chain of spaced, molded articles connected through the medium of the connected runners.

3. Apparatus for molding articles, said apparatus comprising a mold separable on a parting plane, said mold being provided with a plurality of cavities for a plurality of articles connected by gates to a cavity provided in the mold for a runner extending parallel to the parting plane of the mold, said mold being provided with a sprue passage leading to said cavities, ejector means to separate the molded articles and runner as a single body from the mold on opening of the mold, feed means to move the molded piece longitudinally of the runner cavity until the trailing end of the runner is in that portion of the runner cavity for forming the leading end of the runner, the said runner cavity portion being larger than the runner cavity portion for forming the trailing end of the runner, whereby the leading end of the next runner is molded around the trailing end of a preceding runner, and so on, in order to form a continuous chain of spaced, molded articles connected through the medium of the connected runners.

4. Apparatus for molding articles, said apparatus comprising a mold separable on a parting plane, said mold being provided with a cavity for an article and a cavity for a runner extending in the parting plane of the mold, feed means to move the molded piece longitudinally of the runner cavity for a distance slightly less than the length of the runner cavity, the runner cavity portion for forming the leading end of the runner being larger than the runner cavity portion for forming the trailing end of the runner, whereby the leading end of the next runner is molded around the trailing end of a preceding runner, and so on, in order to form a chain of spaced, molded articles connected through the medium of the connected runners, and a trimming die alined with the resulting chain in order to receive the chain from the mold for separating the molded articles from the chain runner.

5. Apparatus for molding articles, said apparatus comprising a mold separable on a parting plane, said mold being provided with a plurality of cavities for a plurality of articles connected by gates to a cavity provided in the mold for a runner extending parallel to the parting plane of the mold, said mold being provided with a sprue passage leading to said cavities, ejector means to separate the molded articles and runner as a single body from the mold on opening of the mold, feed means to move the molded piece longitudinally of the runner cavity until the trailing end of the runner is in that portion of the runner cavity for forming the leading end of the runner, the said runner cavity portion being larger than the runner cavity portion for forming the trailing end of the runner, whereby the leading end of the next runner is molded around the trailing end of a preceding runner, and so on, in order to form a chain of spaced, molded articles connected through the medium of the connected runners, and a trimming die alined with the resulting chain in order to receive the chain from the mold for separating the molded articles from the chain runner and the gates connecting the articles to the runner.

6. Apparatus for molding articles, said apparatus comprising a mold separable on a parting plane, said mold being provided with a cavity for an article and a cavity for a runner extending in the parting plane of the mold, feed means to move the molded piece longitudinally of the runner cavity for a distance slightly less than the length of the runner cavity, the runner cavity portion for forming the leading end of the runner being larger than the runner cavity portion for forming the trailing end of the runner, whereby the leading end of the next runner is molded around the trailing end of a preceding runner, and so on, in order to form a chain of spaced, molded articles connected through the medium of the connected runners, a trimming die alined with the resulting chain in order to receive the chain from the mold for separating the molded articles from the chain runner and for trimming flash or fin from the molded articles, and a spring pad between said mold and said trimming die, said spring pad being so designed as to facilitate the aforesaid feed movement of the chain of molded articles, runners, and sprues.

7. Apparatus for molding articles, said apparatus comprising a mold separable on a parting plane, said mold being provided with a plurality of cavities for a plurality of articles connected by gates to a cavity provided in the mold for a runner extending parallel to the parting plane of the mold, said mold being provided with a sprue passage leading to said cavities, ejector means to separate the molded articles and runner as a single body from the mold on opening of the mold, feed means to move the molded piece longitudinally of the runner cavity until the trailing end of the runner is in that portion of the runner cavity for forming the leading end of the runner, the said runner cavity portion being larger than the runner cavity portion for forming the trailing end of the runner, whereby the leading end of the next runner is molded around the trailing end of a preceding runner, and so on, in order to form a chain of spaced, molded articles connected through the medium of the connected runners, a trimming die alined with the resulting chain in order to receive the chain from the mold for separating the molded articles from the runner and the gates connecting the articles to the runner, and for trimming flash or fin from the molded articles, and a spring pad between said mold and said trimming die, said spring pad being so designed as to facilitate the aforesaid feed movement of the chain of molded articles, runners, and sprues.

8. Apparatus for molding and trimming a plurality of small articles, said apparatus comprising a cover die and an ejector die, one of said dies being provided with a sprue opening directed into said dies to a runner cavity lying in the parting plane of the dies, said runner cavity being enlarged at one end, said dies being provided with cavities for a plurality of articles with gate passages extending from said runner cavity to said article cavities, a nozzle for supplying molding material to said cavities through said sprue opening, feed means for feeding the molded piece longitudinally of the runner cavity a distance a little less than the length of the runner cavity in order to dispose the small trailing end of the runner in the enlarged runner cavity portion for the leading end of the next runner, thereby forming a chain of pieces, and a trimming die alined with the resulting chain in order to receive the chain from the mold for operating on the chain at a later point to trim the molded articles from the runners and gates.

9. Apparatus for molding and trimming a plurality of small articles, said apparatus comprising a cover die and an ejector die, one of said dies being provided with a sprue opening directed into said dies to a runner cavity lying in the parting plane of the dies, said runner cavity being enlarged at one end, said dies being provided with cavities for a plurality of articles with gate passages extending from said runner cavity to said article cavities, a nozzle for supplying molding material to said cavities through said sprue opening, feed means for feeding the molded piece longitudinally of the runner cavity a distance a little less than the length of the runner cavity in order to dispose the small trailing end of the runner in the enlarged runner cavity portion for the leading end of the next runner, thereby forming a chain of pieces, a trimming die alined with the resulting chain in order to receive the chain from the mold for operating on the chain at a later point to trim the molded articles from the chain runner and gates, and a cutting die to cut the chain runner into scrap.

10. Apparatus for molding and trimming a plurality of small articles, said apparatus comprising a cover die and an ejector die, said cover die being provided with a sprue opening directed therethrough to a runner cavity lying in the parting plane of the dies, said runner cavity being enlarged at one end, said dies being provided with cavities for a plurality of articles with gate passages extending from said runner cavity to said article cavities, a sprue post and ejector pins in said ejector die, a nozzle for supplying molding material to said cavities through said sprue opening, feed means for feeding the molded piece longitudinally of the runner cavity a distance a little less than the length of the runner cavity in order to dispose the small trailing end of the runner in the enlarged runner cavity portion for the leading end of the next runner, thereby forming a chain of pieces, means for supporting and guiding said chain, and a trimming die alined with the resulting chain in order to receive the chain from the mold for operating on the chain at a later point to trim the molded articles and separate the same from the runners and gates.

11. Apparatus for molding and trimming a plurality of small articles, said apparatus comprising a cover die and a superposed ejector die, said cover die being provided with a sprue opening directed upwardly therethrough to a runner cavity lying in the parting plane of the die, said runner cavity being enlarged at one end, said dies being provided with cavities for a plurality of articles with gate passages extending from said runner cavity to said article cavities, a sprue post and ejector pins in said ejector die, a nozzle for supplying molding material to said cavities through said sprue opening, feed means for feeding the molded piece longitudinally of the runner cavity a distance a little less than the length of the runner cavity in order to dispose the small trailing end of the runner in the enlarged runner cavity portion for the leading end of the next runner, thereby forming a chain of pieces, a spring pad for supporting and guiding said chain, and a trimming die alined with the resulting chain in order to receive the chain from the mold for operating on the chain at a later point to trim the molded articles and separate the same from the runners and gates.

12. In the molding of articles in a mold having a cover die and an ejector die separable on a parting plane, the method which includes molding simultaneously with a plurality of articles a runner extending parallel to the parting plane of the mold to form a piece comprising the articles in spaced relation with respect to each other but connected through the medium of the runner, opening the mold a substantial amount to remove the molded piece from the cover die and separating the molded piece from the ejector die, moving the molded piece longitudinally of the runner until the trailing end of the runner is opposite that portion of the mold forming the leading end of the runner, closing the mold and moving the molded piece transversely a corresponding amount, molding a like piece as aforesaid with the leading end of the runner of this piece around the trailing end of the runner of the preceding piece, and so on, to form a rod of spaced, molded articles connected through the medium of the connected runners, and at a later trimming station moving the molded piece transversely an amount corresponding to the aforesaid transverse motion at the mold, and trimming the molded articles to separate the same from the runners and the gates connecting the articles to the runners, said rod being bodily moved longitudinally while the mold is open, and transversely while the mold is being opened and closed.

JOHN H. WILHELM.

REFERENCES CITED

The following references are of record in the file of this patent:

UNITED STATES PATENTS

| Number | Name | Date |
| --- | --- | --- |
| 1,449,053 | Pack | Mar. 20, 1923 |
| 1,816,059 | Smith | July 28, 1931 |
| 2,042,541 | Marinsky | June 2, 1936 |
| 2,201,024 | Brown, Jr. | May 14, 1940 |
| 2,238,702 | McIntosh | Apr. 15, 1941 |
| 2,320,566 | Carlile | June 1, 1943 |
| 2,367,303 | Morin | Jan. 16, 1945 |